UNITED STATES PATENT OFFICE.

ERNEST CAMPBELL, OF CALGARY, ALBERTA, CANADA, ASSIGNOR OF ONE-HALF TO THOMAS FRANCIS CASHMAN, OF CALGARY, ALBERTA, CANADA.

TIRE-SEALING COMPOSITION.

1,271,015.      Specification of Letters Patent.      Patented July 2, 1918.

No Drawing.      Application filed February 3, 1917. Serial No. 146,413.

*To all whom it may concern:*

Be it known that I, ERNEST CAMPBELL, of the city of Calgary, in the Province of Alberta, Dominion of Canada, have invented certain new and useful Improvements in Tire-Sealing Compositions, of which the following is the specification.

This invention relates to an improved composition of matter for sealing pneumatic tires or like containers, and the objects of the invention are to provide an inexpensive composition which will occupy small bulk, which when mixed with water will form an effective tire filling composition adapted to quickly seal any puncture in a pneumatic tire and prevent the escape of air therefrom.

The principal ingredients of the composition of matter are an adhesive, such as gum arabic, a relatively heavy filling material such as white lead and talc, and a relatively light filling material such as powdered and granulated cork. The ingredients prior to use are mixed with water in suitable proportions.

The preferred proportion and ingredients are as follows:

| | |
|---|---|
| Water | 2 quarts. |
| Granulated cork | 4 oz. |
| Powdered cork | 2 oz. |
| Talc | 1 lb. |
| White lead | 8 oz. |
| Gum arabic | 2 oz. |

These ingredients are to be thoroughly mingled by agitation.

The composition when mixed may be introduced into the tire or other air containing member in any convenient way. It will be usually found convenient in the case of a tire, to introduce same with a pump through the valve stem. The motion of the tire will cause thorough distribution of the composition which distribution is facilitated by the granulated cork therein, the light weight of which facilitates distribution. Should the tire be punctured the composition will at once flow through the punctured portion, the gum arabic will thereupon adhere and inclosure will be effected.

As many changes could be made in the above composition and many apparently widely different embodiments of my invention, within the scope of the claims, constructed without departing from the spirit or scope thereof, it is intended that all matter contained in the accompanying specification and claims shall be interpreted as illustrative and not in a limiting sense.

What I claim as my invention is:

1. The herein described composition of matter for the purpose specified, comprising an adhesive, white lead, talc, cork and water, substantially as and for the purpose specified.

2. The herein described composition of matter for the purpose specified, comprising water, cork, talc, white lead, and gum arabic, substantially as and for the purpose specified.

3. The herein described composition of matter consisting of water, granulated cork, powdered cork, talc, white lead and gum arabic, substantially as and for the purpose specified.

4. The herein described composition of matter for use in sealing up and preventing air escaping from automobile tires, pneumatic or other air inflated tires through punctures, such composition consisting of:

| | |
|---|---|
| Water | 2 quarts. |
| Granulated cork | 4 oz. |
| Powdered cork | 2 oz. |
| Talc | 1 lb. |
| White lead | 8 oz. |
| Gum arabic | 2 oz. | substantially as described.

In witness whereof I have hereunto set my hand in the presence of two witnesses.

ERNEST CAMPBELL.

Witnesses:
    KATHARINE HANSON,
    IRENE KIRWAN.